US 7,794,847 B2
Sep. 14, 2010

(12) United States Patent
Chasey et al.

(54) PROPYLENE ELASTOMERS FOR ELECTRICAL WIRE AND CABLE COMPOUNDS

(75) Inventors: Kent Leon Chasey, Houston, TX (US); Narayanaswami Raja Dharmarajan, Houston, TX (US); Periagaram Srinivasan Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 807 days.

(21) Appl. No.: 11/599,147

(22) Filed: Nov. 14, 2006

(65) Prior Publication Data

US 2007/0134506 A1 Jun. 14, 2007

Related U.S. Application Data

(60) Provisional application No. 60/749,772, filed on Dec. 13, 2005.

(51) Int. Cl.
*B32B 27/00* (2006.01)
*B32B 27/08* (2006.01)
*B29C 47/00* (2006.01)
*B29D 22/00* (2006.01)

(52) U.S. Cl. .................... 428/500; 428/35.7; 428/36.9; 428/515; 156/244.11

(58) Field of Classification Search .................. None
See application file for complete search history.

(56) References Cited

U.S. PATENT DOCUMENTS

| | | | | |
|---|---|---|---|---|
| 3,792,192 A | * | 2/1974 | Plate, Walter J. | 174/102 SC |
| 4,382,112 A | | 5/1983 | Betts et al. | 428/379 |
| 4,684,687 A | | 8/1987 | Breach et al. | 524/291 |
| 6,800,693 B2 | | 10/2004 | Nishihara et al. | 525/191 |
| 6,803,391 B2 | | 10/2004 | Paglia et al. | 522/6 |
| 2002/0042464 A1 | | 4/2002 | Barclay et al. | 524/425 |
| 2004/0102551 A1 | | 5/2004 | Sato et al. | 524/115 |
| 2004/0118592 A1 | | 6/2004 | Pehlert | 174/110 |
| 2005/0133248 A1 | | 6/2005 | Easter | 174/137 B |

FOREIGN PATENT DOCUMENTS

| | | |
|---|---|---|
| EP | 1 223 191 | 7/2002 |
| EP | 1 384 752 | 1/2004 |

OTHER PUBLICATIONS

Plastics Technology: "New Metallocene TP Elastomers Tackle Films, Fibers, TPOs", by Lilli Manolis Sherman—publishing dates unknown, 4 pages.
Plastics Technology: Your Business in Brief, 3 pages, Aug. 2003.
ExxonMobil News Release, "ExxonMobil Chemical Introduces Vistamaxx™ Specialty Elastomers Generation Solutions", 2 pages, Jun. 24, 2003.

* cited by examiner

*Primary Examiner*—Sheeba Ahmed

(57) ABSTRACT

The present disclosure is directed to an electrical device comprising a propylene-alpha olefin polymer, wherein the propylene-alpha olefin polymer comprises from about 5 to about 25 wt % alpha olefin, from about 75 to about 95 wt % propylene and optionally ≦10 wt % diene, wherein the propylene-alpha olefin polymer has a MWD of from about 1 to about 5, a heat of fusion less than or equal to 75 J/g and a $T_m \leq 105°$ C.

49 Claims, 1 Drawing Sheet

PROPYLENE ELASTOMERS FOR ELECTRICAL WIRE AND CABLE COMPOUNDS

CROSS REFERENCE TO RELATED APPLICATION

This application claims the benefit of Provisional Application No. 60/749,772 filed Dec. 13, 2005, the disclosure of which is incorporated by reference.

FIELD

This disclosure relates to polymer compounds for use in wire and/or cable applications.

BACKGROUND

A wide variety of polymeric materials have been utilized as electrical insulating materials for power cables and other electrical devices. Ethylene propylene co-polymers and ethylene, propylene and diene terpolymers (EPDM) having polyethylene-type crystallinity are commercially used in medium voltage electrical insulation compounds. These compounds are applied as an insulation member over either a metallic conductor or a semi-conductive substrate in a multi-step extrusion process. Typical insulating compounds may also include fillers and various additives.

EPDM polymers can provide good insulating properties. However, surface characteristics of the extrudate in a compound based on these elastomeric polymers may not be smooth at typical high extrusion rates, which is desirable because of improved interfacial adhesion between the cable layers. Therefore, one prior method attempted to reduce the extrusion rates, but it was not economically advantageous. The present disclosure provides a way to decrease the surface roughness, thereby increasing the smoothness, while maintaining high extrusion rates.

It would be desirable to have a polymeric composition suitable for use in compounds for electrical applications, such as cable coating compounds, which exhibit decreased surface roughness, improved tack and adhesion, enhanced physical properties and/or performance, and provide improved manufacturing capability and quality, without loss of tensile strength or elongation at break.

SUMMARY

Figure 1:
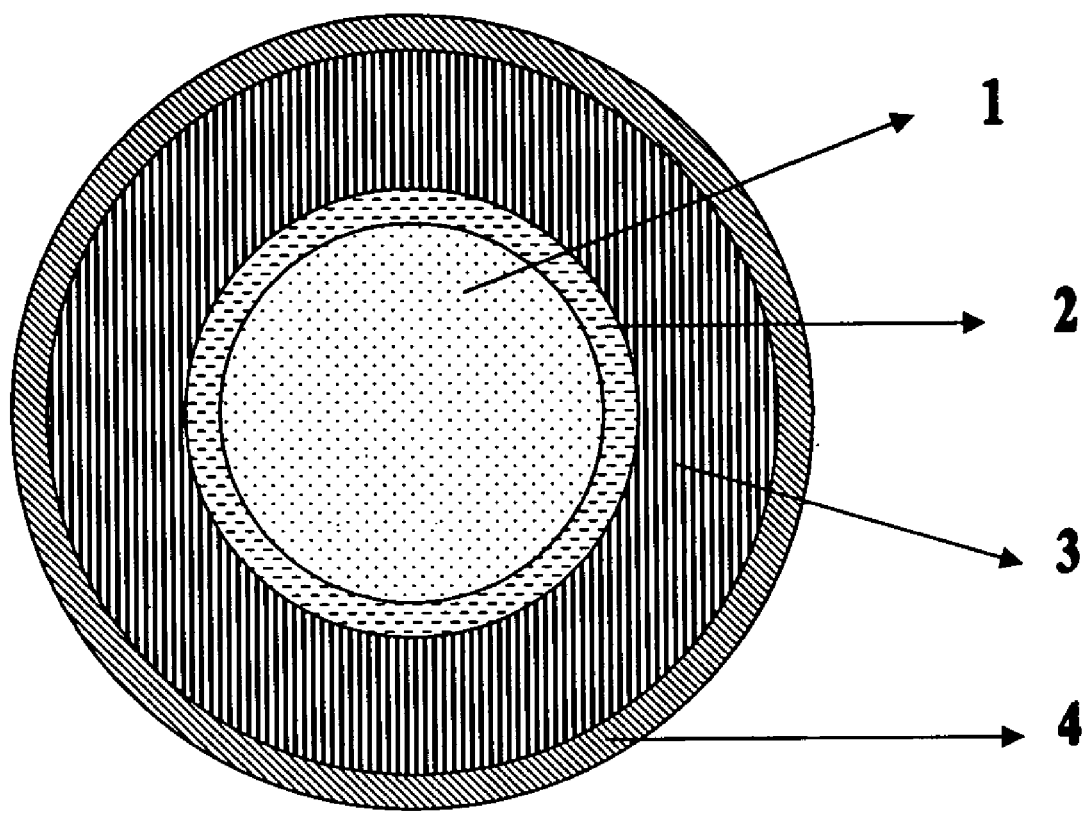
FIG. 1 is a cross-sectional view of a typical electrical device.

An embodiment of this disclosure is an electrical device comprising a propylene-ethylene polymer, wherein the propylene-ethylene polymer comprises from about 5 to about 25 wt % ethylene, from about 75 to about 95 wt % propylene and optionally $\leq$10 wt % diene, wherein the propylene-ethylene polymer has a MWD of from about 1 to about 5, a heat of fusion less than or equal to 75 J/g and a $T_m \leq 105°$ C. The electrical device may comprise an insulation layer and/or an insulation shield layer, and the propylene-ethylene polymer may be in the insulation shield layer and/or in the insulation layer.

Another embodiment of this disclosure is a process for making an electrical device comprising: providing a conductor and extruding at least one layer over the conductor, wherein at least one of the layers comprises a propylene-ethylene polymer comprising from about 5 to about 25 wt % ethylene, from about 75 to about 95 wt % propylene and optionally $\leq$10 wt % diene; wherein the propylene-ethylene polymer has a MWD of from about 1 to about 5, a heat of fusion less than or equal to 75 J/g and a $T_m \leq 105°$ C.

Another embodiment of this disclosure is a cable coating compound comprising a propylene-ethylene polymer, wherein the propylene-ethylene polymer comprises from about 5 to about 25 wt % ethylene, from about 75 to about 95 wt % propylene and optionally $\leq$10 wt % diene, wherein the propylene-ethylene polymer has a MWD of from about 1 to about 5; and a $T_m \leq 105°$ C.

Another embodiment of this disclosure is a wire or cable comprising a conductor and an insulation layer over the conductor; wherein the insulation layer comprises about 5 to about 10 wt % propylene-ethylene polymer, wherein the propylene-ethylene polymer, having a melting point of about 75° C. or less, and a heat of fusion of 50 J/g or less, comprises about 5-16 wt % ethylene and further comprises a second polymer wherein the second polymer is EPDM or isotactic polypropylene.

Another embodiment of this disclosure is a wire or cable comprising a conductor and an insulation layer and/or an insulation shield layer over the conductor; wherein the insulation layer and/or the insulation shield layer comprises from about 2 to about 80 wt % propylene-ethylene polymer, based on the weight of the layer, wherein the propylene-ethylene polymer, having a melting point of about 75° C. or less, and a heat of fusion of 50 J/g or less, comprises about 5-16 wt % ethylene and further comprises a second polymer wherein the second polymer is EPDM or isotactic polypropylene.

DESCRIPTION

In one embodiment, the present disclosure is directed to an electrical device comprising a conductor and one or more layers over the conductor. One or more of the layers comprises a propylene-α-olefin polymer as described herein.

As shown in FIG. 1, a typical wire or cable comprises a conductor (1), a conductor shield layer (2), a first layer (3), also referred to as an insulation layer, and an optional second layer (4), also referred to as an insulation shield layer. The propylene-α-olefin polymer described below is particularly useful in the first layer or in the second layer or in both layers.

Propylene α-Olefin Polymer

The propylene-α-olefin polymer described herein is a copolymer of propylene-derived units and one or more units derived from a $C_2$ or $C_4$-$C_{20}$ α-olefin and optionally one or more diene-derived units. Preferred α-olefins are ethylene, butene, hexene and octene.

Typical comonomer content of the polymer is from about 5 to about 35 wt %. In general, the comonomer content is adjusted so that the polymer preferably has a MWD of from about 1 to about 5, a heat of fusion less than or equal to 75 J/g and a $T_m \leq 105°$ C. In some embodiments, where more than one comonomer is present, the amount of a particular comonomer may be <5 wt %, but the combined comonomer content is preferably >5 wt %.

In such an embodiment, when there is more than one alpha olefin-derived unit in the polymer, the total weight percent of the $C_2$ or $C_4$-$C_{20}$ alpha olefin-derived units is preferably from about 5 wt % to about 35 wt %, more preferably from about 7 wt % to about 32 wt %, more preferably from about 8 wt % to about 25 wt %, more preferably from about 8 wt % to about 20 wt %, and more preferably from about 8 wt % to about 16 wt %. Particular embodiments of polymers having more than one alpha olefin include propylene-ethylene-octene, propylene-ethylene-hexene and propylene-ethylene-butene polymers. These polymers may further comprise a diene as described below.

The embodiments described below are discussed with reference to ethylene as a preferred comonomer, but such embodiments are equally applicable with butene, hexene or octene as a comonomer. The propylene-ethylene polymer described below comprises ethylene, propylene and optionally a diene.

The propylene-ethylene polymer can comprise from about 5 to about 25 wt % ethylene, preferably from about 5 to about 20 wt %, more preferably from about 5 to about 16 wt %, more preferably from about 5 to about 15 wt %, and more preferably from about 6 to about 15 wt % ethylene. In a preferred embodiment, the propylene-ethylene copolymer comprises greater than 11 wt % ethylene.

The propylene-ethylene polymer can comprise from about 75 to about 95 wt % propylene, preferably from about 80 to about 95 wt %, more preferably from about 84 to about 95 wt %, more preferably from about 85 to about 95 wt %, and more preferably from about 85 to about 94 wt %.

The propylene-ethylene polymer may optionally comprise $\leq 10$ wt % diene, preferably less than or equal to about 5 wt % diene, more preferably less than or equal to about 3 wt % diene, preferably from about 0.1 to about 3 wt %, more preferably from about 0.1 to about 2 wt %, and more preferably from about 0.1 to about 1 wt % diene. Suitable dienes useful as co-monomers are, for example: 1,4-hexadiene, 1,6 octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene is most preferably ENB.

Preferred propylene-ethylene polymers have a triad tacticity, as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers as the ratio of the number of units of the specified tacticity to all of the propylene triads in the copolymer.

In a preferred embodiment, the propylene-ethylene polymer may have a heat of fusion ($\Delta$Hf) which is greater than or equal to about 0.5 Joules per gram (J/g), and is less than or equal to about 70 J/g, preferably less than or equal to about 50 J/g, preferably less than or equal to about 35 J/g, preferably less than or equal to about 25 J/g. Preferably the propylene-ethylene polymers also have a heat of fusion that is greater than or equal to about 1 J/g, preferably greater than or equal to about 2.5 J/g, preferably greater than or equal to about 5 J/g.

Thermodynamic heat of fusion data may be determined by differential scanning calorimetry (DSC), the procedure for which is as follows. About 6 to about 10 mg of a sheet of the polymer pressed at approximately 200° C. to 230° C. and cooled at ambient conditions (25° C. and 50% humidity for 24 hours) is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion.

In a preferred embodiment, the propylene-ethylene polymer has a % crystallinity of from 0.5 to 40, preferably 1 to 30, and more preferably 5 to 25 wherein % crystallinity is determined according to the DSC procedure described herein. For use herein, the crystallinity of the propylene-ethylene polymer can also be expressed in terms of percentage of crystallinity. The thermal energy for the highest order of polypropylene is estimated at 189 J/g (i.e., 100% crystallinity is equal to 189 J/g). In another embodiment, the propylene-ethylene polymer of the present disclosure preferably has a crystallinity of less than 40%, preferably about 0.25% to about 25%, more preferably from about 0.5% to about 22%, and most preferably from about 0.5% to about 20%.

In addition to this level of crystallinity, the propylene-ethylene polymer preferably has a single broad melting transition. The melting point is defined as the temperature of the greatest heat absorption within the range of melting of the sample. However, the propylene-ethylene polymer may show secondary melting peaks adjacent to the principal peak, but for purposes herein, such secondary melting peaks are considered together as a single melting point, with the highest of these peaks being considered the melting point ($T_m$) of the propylene-ethylene polymer. The propylene-ethylene polymer preferably has a melting point of from about 25° C. to 105° C., preferably from 25° C. to about 85° C., preferably from 25° C. to about 75° C., preferably about 25° C. to about 65° C., more preferably about 30° C. to about 80° C., more preferably about 30° C. to about 70° C. and more preferably about 30° C. to about 60° C.

Preferred propylene-ethylene polymers may have a Mooney viscosity [ML (1+4)@125° C.] as determined according to ASTM D1646, of less than 100, more preferably less than 75, even more preferably less than 60, most preferably less than 30.

The molecular weight distribution index (MWD=(Mw/Mn)) of the propylene-ethylene polymer may be about 1 to about 40, more preferably about 1 to about 5, more preferably about 1.8 to about 5 and most preferably about 1.8 to about 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein.

The triad tacticity (mm fraction) of a propylene-ethylene copolymer can be determined from a $^{13}$C NMR spectrum of the propylene-ethylene copolymer and the following formula:

$$mm\ Fraction = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

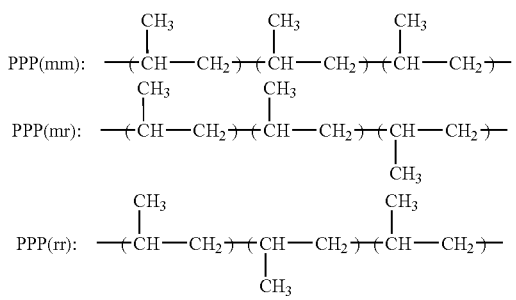

The $^{13}C$ NMR spectrum of the propylene-ethylene polymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppmy and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP (mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

Preferred propylene-ethylene polymers are available commercially under the trade names Vistamaxx™ (ExxonMobil Chemical Company, Houston, Tex., USA) and Versify™ (The Dow Chemical Company, Midland, Mich., USA).

Conductor Shield Layer

The conductor shield layer is an electrically semi-conducting layer which causes the electric field to be uniform around the conductor. Methods and materials for making the conductor shield layer will be readily apparent to the skilled artisan. In a typical embodiment, the conductor shield layer preferably comprises ethylene-vinyl acetate (EVA), ethylene-ethyl acrylate (EEA), ethylene-propylene (EP) rubber, carbon black, and/or combinations of any two or more thereof. The conductor shield layer has a Ra surface roughness of about 0.1 to about 10 microns, more preferably about 0.1 to about 8 microns, more preferably from about 0.1 to about 5 microns, and more preferably from about 0.1 to about 3 microns. The conductor shield layer has a Rt surface roughness of about 5 to about 50 microns, more preferably from about 10 to about 40 microns, more preferably from about 20 to about 30 microns, and more preferably from about 5 to about 20 microns.

The surface roughness of the extrudate was measured using a Surfcom® 110 B surface gauge (manufactured by Tokyo Seimitsu Company). The Surfcom® instrument contains a diamond stylus which moves across the surface of the sample subject to evaluation. The instrument recorded the surface irregularities over the length (assessment length) traveled by the diamond stylus. This surface roughness was quantified in terms of two factors:

1. $R_a$ (μm), an arithmetic mean representing the departure of the extrudate surface profile from a mean line.
2. $R_t$ (μm), the vertical distance between the highest point and the lowest point of the extrudate roughness profile within the assessment length.

Insulation Layer

In a typical embodiment, the insulation layer comprises preferably from about 2 to about 20 wt % propylene-alpha olefin polymer, preferably from about 3 to about 18 wt % propylene-alpha olefin polymer, preferably from about 4 to about 16 wt % propylene-alpha olefin polymer, preferably from about 5 to about 16 wt % propylene-alpha olefin polymer, and preferably from about 6 to about 16 wt % propylene-alpha olefin polymer. A preferred alpha olefin for the propylene-alpha olefin polymer used in the insulation layer is ethylene. In a typical embodiment, the insulation layer comprises suitable formulations such as those described in Examples 1, 2 or 3 (and may also comprise other materials such as tree retardant cross-linked low density polyethylene (TRXLPT), an ethylene-propylene rubber (EPR), or a copolymer of ethylene and a $C_4+$ alpha-olefin, such as, for example, ethylene-butene, ethylene-hexene, or ethylene-octene copolymers). The insulation layer has a Ra surface roughness of about 0.1 to about 2 microns, more preferably about 0.1 to about 1.8 microns, more preferably from about 0.1 to about 1.5 microns, and more preferably from about 0.1 to about 1.0 microns. The insulation layer has a Rt surface roughness of about 8 to about 30 microns, more preferably from about 10 to about 25 microns, more preferably from about 15 to about 23 microns, and more preferably from about 15 to about 20 microns. The insulation layer may also include propylene-ethylene copolymers as described above and may also include EPDM.

Insulation Shield Layer

In a typical embodiment, the insulation shield layer comprises an ethylene-propylene rubber (EPR), ethylene-vinyl acetate (EVA), ethylene-ethyl acrylate (EEA), low-density polyethylene (LDPE) and EVA blends, ethylene-propylene diene monomers (EPDM), carbon black and/or combinations of any two or more thereof. The insulation shield layer has a Ra surface roughness of about 0.1 to about 10 microns, more preferably about 0.1 to about 8 microns, more preferably from about 0.1 to about 5 microns, and more preferably from about 0.1 to about 3 microns. The insulation shield layer has a Rt surface roughness of about 5 to about 50 microns, more preferably from about 10 to about 40 microns, more preferably from about 20 to about 30 microns, and more preferably from about 5 to about 20 microns.

In an embodiment, the insulation shield layer comprises from about 2 to about 80 wt % propylene-alpha olefin polymer, based on the weight of the layer, preferably from about 3 to about 70 wt % propylene-alpha olefin polymer, preferably from about 4 to about 65 wt % propylene-alpha olefin polymer, preferably from about 4 to about 63 wt % propylene-alpha olefin polymer, and preferably from about 4 to about 60 wt % propylene-alpha olefin polymer. A preferred alpha olefin for the propylene-alpha olefin polymer used in the insulation shield layer is ethylene.

One or more of the layers described herein may comprise a second polymer. The second polymer may be selected from: propylene and propylene-ethylene homo-, co- or ter-polymers. In a preferred embodiment, the second polymer is EPDM and/or isotactic polypropylene. In one embodiment the second polymer is EPDM. In such embodiments the layers containing EPDM may contain from about 40 to about 99.9 wt % EPDM and from about 0.1 to about 60 wt % propylene-ethylene polymer, preferably from about 40 wt % to about 100 wt % EPDM and from about 0.1 wt % to about 60 wt % propylene-ethylene polymer, more preferably from about 5 to about 50 wt % EPDM, and from about 10 to about 40 wt % propylene-ethylene polymer. In some embodiments where there is no propylene-ethylene polymer, the layer may contain 100 wt % EPDM.

The formulation in the first layer or the second layer can also be blended with processing oil and other common additives such as nucleating agents, antioxidants, fillers, such as metal oxides, nano-compositions, and the like. Blends comprising propylene-ethylene polymers of this disclosure and other alpha-olefin polymers and copolymers, e.g., polypropylene may also be fabricated into objects used in a variety of applications. The additive(s) can be used not only in the first and second layers, but also in other places within the electrical device, such as, for example, the conductor (in which the additive can be inserted as a component of a filling composition), in an appropriate amount, which can be determined by the skilled in the art to provide the results of the disclosure.

Current day EPDM and EPM medium-voltage cable insulation typically employs lead oxide as an additive to ensure good electrical performance for many years. However, some applications seek similar performance without the presence of lead oxide. In one embodiment, it is desirable to make the electrical device lead-free, and substitute lead in one or more layers with suitable alternatives of other metal oxides, including but not limited to, manganese oxide, copper oxide, zinc oxide and bismuth oxide. As used herein, "lead-free" means essentially free of lead, which is less than 10 ppm, and preferably less than 5 ppm based on the weight of the compound used to extrude a particular layer.

In one embodiment, interfacial adhesion and bonding between the conductor-shield layer and the first layer or between the first layer and the optional second layer can be controlled according to the level of peroxide curative added to one or more of any of the layers.

This disclosure can be applied to any extruded products such as in tubestock and/or coverstock layers of hoses, in automotive weather stripping, and any other extruded product.

EXAMPLES

Test Methods

TABLE 1

| Parameter | Units | Test |
|---|---|---|
| Mooney Viscosity | ML (1 + 4) @ 125° C., MU | ASTM D 1646 |
| Oscillating Disk Rheometer (ODR) @ 200° C., 3° arc | | ASTM D 2084 |
| ML | dNm | |
| MH | dNm | |
| Cure State = (MH − ML) | dNm/minute | |
| $T_s2$ | minute | |
| $T_{90}$ | minute | |
| $T_{98}$ | minute | |
| Physical Properties - press cured 20 min @ 165° C. | | |
| Hardness | Shore A | ASTM D 2240 |
| Modulus 100%, 200%, 300% | MPa | ASTM D 412-92 |
| Tensile Strength | MPa | ASTM D 412-92 |
| Elongation at Break | % | ASTM D 412-92 |
| Tear Resistance | N/mm | ASTM D 624 - die C |
| Peak Load | N | ASTM D412 |

The samples were compression molded at 165° C. for 20 minutes at a force of about 15 U.S. tons (about 13.6 metric tons) into a plaque with dimensions of about 15 cm×15 cm. The cooled plaques were removed, and the dumb bell specimens were die cut from this plaque per ASTM 412-92 recommended dimensions. The stress strain evaluation of the samples was conducted on an Instron 4465, made by Instron Corporation of 100 Royall Street, Canton, Mass. The digital data was collected in a file collected by the Series IX Material Testing System available from Instron Corporation and analyzed using Excel 5, a spreadsheet program available from Microsoft Corporation of Redmond, Wash. The elongation of the compounds was determined at a test speed of 50.8 cm/min (20 in/min) according to the procedure described in ASTM D790. The data was reported in engineering units with no correction to the stress for the lateral contraction in the specimen due to tensile elongation.

Tear resistance between adjacent layers of compounds was tested by a strip-peel adhesion test. The test involves:

(a) calendaring of each compound to 2.5 mm±0.1 mm (110 mils±5 mils) with temperatures of 95° C. for the top roll and 80° C. for the middle and bottom rolls;

(b) preparation of test specimens by combining about 2.5 cm by 15 cm strips of the calendared compounds in a hydraulic press at the conditions of 165° C. for 20 minutes; and (c) measurement of the tear resistance between the layers with an Instron tensile-tester. A load cell weighing about 91 kilograms (200-lb) was used in the Instron machine mentioned above with a crosshead speed of 50 mm/min and a total Instron jaw travel distance of 101.6 mm.

Compound extrusion studies were performed in a HAAKE Rheocord 90 single screw extruder. The screw length to diameter (L/D) for this extruder was 20/1. The extruder screw has a compression ratio of 2/1, which is typical for processing rubber compounds. A cylindrical die with a land length of 9.5 mm and diameter of 3.2 mm was used to assess surface appearance of the extrudates.

Materials Used

TABLE 2

| Components | Description | Source |
|---|---|---|
| Translink 37 | Calcined Clay | Englehard Corp. (Iselin, NJ) |
| Drimix A 172 | Vinyl Silane | Kenrich Petrochemicals, Inc. (Bayonne, NJ) |
| Escorene LD 400 | Low Density Polyethylene | ExxonMobil Chemical Company (Houston, TX) |
| IGI 1230 | Refined paraffin wax | The International Group, Inc. (Wayne, PA) |
| Dicup 40 KE | Dicumyl peroxide on clay (40% Active) | Hercules Inc. (Wilmington, DE) |
| ERD 90 | Red Lead | Rhein Chemie Corp. (Trenton, NJ) |
| XC-72 carbon black | Conductive black | Cabot Corp. (Atlanta, GA) |

Polymer A was a propylene-ethylene copolymer having an ethylene content of about 16 wt %, a density of about 0.855 g/cm$^3$, a MFR (230° C., 2.16 kg, ASTM 1238) of about 3 g/10 min, a melt index (MI) (190° C., 2.16 kg, ASTM D 1238) of about 1.3 g/10 min and a melting point of about 46° C. Polymer A is commercially available as Vistamaxx™ 1000 from ExxonMobil Chemical Company, Houston, Tex., USA.

Polymer B was a propylene-ethylene copolymer composition having an ethylene content of about 11 wt %, a density of about 0.871 g/cm$^3$, a MFR (230° C., 2.16 kg, ASTM 1238) of about 8 g/10 min, a MI (190° C., 2.16 kg, ASTM D 1238) of about 4 g/10 min, and a melting point of about 62° C. Polymer B is commercially available as Vistamaxx™ 3000 from ExxonMobil Chemical Company, Houston, Tex., USA.

Polymer C was an EPDM elastomer with an ethylene content of about 76%, and an ENB content of about 3.3%, and a Mooney viscosity of about 24.

Polymer D was an EPDM elastomer with an ethylene content of about 76.1%, a VNB content of about 0.9%, and a Mooney viscosity of about 25.

Blend 1 was a blend of about 95 wt % Polymer A and about 5 wt % isotactic polypropylene having an MFR (230° C., 2.16 kg, ASTM 1238) of about 36 g/10 min, a density of about 0.9 g/cm$^3$ (ASTM 792) and a Mw/Mn of about 2.8. Blend 1 is commercially available as Vistamaxx™ 1100 from ExxonMobil Chemical Company, Houston, Tex., USA.

Polymer A and Polymer B were produced according to the general procedure discussed in WO 0236651 (Example 1).

Process

The formulations in Examples 1, 2 and 3 were made as follows. Table 3 shows the mixing procedure for the medium voltage electrical compound formulations of Examples 1, 2, and 3 containing 60 phr clay and other additives. The clay, Translink 37, was a calcined surface modified (vinyl modification) kaolin. All of the compounding was performed in a 1600 cc Banbury internal mixer. The mix batch was sized to about 1450 gm to occupy the internal volume of the Banbury mixer. The compounds discharged from the Banbury mixer were sheeted out in a two roll mill. The peroxide was added in the mill to 300 grams of the compound. As used herein, "dump" was when the batch was discharged from the mixer. As used herein, "sweep" was when the ram was raised up while mixing to allow the batch to turn over completely. Sweep helps to incorporate the clay that was hung up on the ram during the addition into the mixer.

TABLE 3

| Time (minutes) | Rotor Speed (RPM) | Ingredients Addition |
|---|---|---|
| 0.0 | 85 | Polymer, Agerite |
| 0.5 | 85 | ½ Clay, Zinc Oxide, ERD 90, ½ Drimix, Escorene LD 400 |
| 2.0 | 100 | ¼ Clay, ¼ Drimix, ½ Wax |
| 3.0 | 100 | ¼ Clay, ¼ Drimix, ½ Wax |
| 4.0 | 100 | Sweep |
| 5.5 | 100 | Sweep |
| 7.0 | Not applicable | Dump |

The Examples were then tested for the properties as listed in Table 4 using the test methods as described herein.

TABLE 4

| | Example | | |
|---|---|---|---|
| | 1 | 2 | 3 |
| Components | | | |
| Polymer C | 100 | 100 | 100 |
| Blend 1 | — | 12 | — |
| Polymer B | — | — | 12 |
| Translink 37 Clay | 60 | 60 | 60 |
| Drimix A172 Silane | 1.0 | 1.0 | 1.0 |
| Zinc Oxide | 5.0 | 5.0 | 5.0 |
| Paraffin Wax 1230 | 5.0 | 5.0 | 5.0 |
| Escorene LD 400 | 5.0 | 5.0 | 5.0 |
| DiCup 40KE | 6.5 | 6.5 | 6.5 |
| Total parts by weight: | 182.5 | 194.5 | 194.5 |
| ODR: 180° C. | | | |
| ML, dNm | 8.32 | 7.86 | 7.90 |
| MH, dNm | 61.04 | 41.84 | 45.11 |
| MH-ML, dNm | 52.72 | 33.98 | 37.21 |
| T$_S$2, min | 0.84 | 0.99 | 1.27 |
| T$_{90}$, min | 4.23 | 4.00 | 4.48 |
| T$_{98}$, min | 5.70 | 5.26 | 5.81 |
| Physical Properties | | | |
| Hardness, Shore A | 88 | 85 | 86 |
| 100% Modulus, MPa (psi) | 4.8 (695) | 3.9 (571) | 4.1 (590) |
| 200% Modulus, MPa (psi) | 6.8 (984) | 5.2 (749) | 5.4 (789) |
| 300% Modulus, MPa (psi) | 8.0 (1161) | 6.0 (863) | 6.5 (938) |
| Tensile Strength, MPa (psi) | 10.3 (1497) | 10.2 (1478) | 12.2 (1760) |
| Elongation at Break, % | 578 | 715 | 724 |
| Surface Roughness | | | |
| Ra, microns | 1.38 | 0.86 | 1.95 |
| Rt, microns | 10.53 | 6.76 | 16.79 |

Example 1 was a typical medium voltage insulation compound. This formulation was based on Polymer C which was produced using a Ziegler-Natta catalyst. Also provided were alternative formulations in which 12 parts per hundred rubber (phr) of either Blend 1 (Example 2) or Polymer B (Example 3) were added to the reference formulation.

Table 4 provides oscillating disk rheometer (ODR) data for Examples 1, 2 and 3, stress/strain and hardness properties for the vulcanized compounds, and surface-roughness evaluations for unvulcanized ribbon samples, produced with a Haake laboratory extruder and a flat strip die.

The various zones of the extruder and the die block temperature were maintained constant at 125° C. Granulated rubber was fed through the extruder hopper to maintain a full screw, but an empty hopper during extrusion. The extruder screw speed was varied from 25 rpm to 100 rpm. The mass throughput was measured at every screw speed by collecting a sample of the extrudate over a specific length of time, typically 10 to 30 seconds depending on the screw speed. At least three samples were collected to provide an average value.

The ODR results show reduced development of torque during vulcanization of Examples 2 and 3, (containing the products of Blend 1 and Polymer B), when compared to Example 1. The peak cure rates for Examples 2 and 3 were also slightly lower than for Example 1.

The stress/strain results were median values for five determinations. The results do not generally reflect the differences seen by ODR, and show that addition of Blend 1 or Polymer B does not lead to significant loss in two key properties: tensile strength and elongation at break. The low-strain modulus values for Examples 2 and 3 were slightly lower than for Example 1, which was directionally consistent with the ODR observation, but this result can be advantageous, as reduced low-strain modulus can provide improved cable flexibility.

The results also show that surface-roughness properties were greatly improved by addition of Blend 1. This finding highlights the unexpected nature of the reduction in surface roughness which occurs by addition of specialty propylene elastomers, and indicates the important attributes of the compositional makeup of Blend 1. The reduction in Ra and Rt values observed with addition of Blend 1 reflects a significant improvement in surface roughness, which should provide better interfaces between the insulation layer and other component layers of typical wire and/or cable applications.

Examples 4-7

Table 5 provides the formulation for another reference medium-voltage insulation Example (4). This formulation was based on Polymer D.

Also provided in Table 5 are test formulations representing three semi-conductive shield Examples (5, 6, 7). Example 5 was based on Polymer D. Examples 6 and 7 were based on Blend 1, and also contained process oil.

The compounds of these examples were made in the manner described above. The Examples were then tested for peak load (N) and tear resistance (N/mm). The results for which are shown in Table 6.

Table 6 also provides results for the strip-peel adhesion test, as described herein, which compared insulation Example 4 with the three semi-conductive shield Examples 5, 6, and 7. The strip-peel adhesion test measured the tear resistance between adjacent layers of Example 4 with either Examples 5, 6, or 7. Thus, the pairs of Examples tested represent the following combinations:

4/5 is EPDM against EPDM
4/6 was EPDM against Blend 1 with 10 phr oil, and
4/7 was EPDM against Blend 1 with 20 phr oil.

The results clearly indicated improved adhesion (as measured by peak-load and tear-resistance) in the order 4/7>4/6>4/5.

TABLE 5

| | Examples | | | |
|---|---|---|---|---|
| | 4 | 5 | 6 | 7 |
| Components | | | | |
| Polymer D | 100 | 100 | — | — |
| Blend 1 | — | — | 100 | 100 |
| Translink ™ 37 Clay | 60 | — | — | — |
| XC-72 Carbon Black | — | 60 | 60 | 60 |
| Plastol 537 | — | 10 | 10 | 20 |
| Drimix A172 Silane | 1.0 | — | — | — |
| Zinc Oxide | 5.0 | — | — | — |
| Paraffin Wax 1230 | 5.0 | — | — | — |
| Escorene LD 400 (LDPE) | 5.0 | — | — | — |
| ERD-90 | 5.0 | — | — | — |
| DiCup 40KE | 6.5 | — | — | — |
| Total phr: | 187.5 | 170 | 170 | 180 |

TABLE 6

| | Examples | | |
|---|---|---|---|
| | 4/5 | 4/6 | 4/7 |
| Peak Load, N | 72.4 | 82.4 | 101.9 |
| Tear Resistance, N/mm | 2.0 | 2.4 | 3.1 |

Semi-conductive shield compounds based on EPDM are typically peroxide-cured. Examples 5, 6, and 7 were prepared without peroxide in order to test the potential for reduction or elimination of peroxide in the shield compound. The improved adhesion observed with the use of Blend 1 in Examples 6 and 7 (versus the use of EPDM in Example 5) could allow a reduction in the typical peroxide content for the shield compound.

We claim:

1. An electrical device comprising a propylene-ethylene polymer, wherein the propylene-ethylene polymer comprises from about 5 to about 25 wt % ethylene, from about 75 to about 95 wt % propylene and optionally ≦10 wt % diene, wherein the propylene-ethylene polymer has a MWD of from about 1 to about 5, a heat of fusion less than or equal to 75 J/g and a $T_m \leqq 105°$ C.

2. The electrical device of claim 1 comprising a conductor, a first layer over the conductor and/or a second layer over the first layer, and wherein the propylene-ethylene polymer is present in the first layer and/or the second layer.

3. The electrical device of claim 1 wherein the propylene-ethylene polymer has a $T_m$ of about 30° C. to about 80° C.

4. The electrical device of claim 1 wherein the propylene-ethylene polymer has a heat of fusion of from about 0.1 to about 35 J/g.

5. The electrical device of claim 1 wherein the propylene-ethylene polymer has a triad tacticity of three polymer units of about 75% or greater.

6. The electrical device of claim 5 wherein the propylene-ethylene polymer has a triad tacticity of three polymer units of about 80% or greater.

7. The electrical device of claim 2 wherein the first layer comprises the propylene-ethylene polymer.

8. The electrical device of claim 2 wherein the second layer comprises the propylene-ethylene polymer.

9. The electrical device of claim 2 wherein the first layer and/or the second layer comprises from about 5 to about 20 wt % propylene-ethylene polymer.

10. The electrical device of claim 9 wherein the first layer further comprises a second polymer.

11. The electrical device of claim 9 wherein the second layer further comprises a second polymer.

12. The electrical device of claim 10 wherein the second polymer is ethylene- and/or propylene-based.

13. The electrical device of claim 12 wherein the second polymer is EPDM and is present from about 40 wt % to about 99.9 wt % and the propylene-ethylene polymer is present from about 0.1 wt % to about 60 wt %, based upon the weight of the layer.

14. The electrical device of claim 11 wherein the second polymer is ethylene and/or propylene based.

15. The electrical device of claim 11 wherein the second polymer is EPDM and is present from about 40 wt % to about 100 wt % and the propylene-ethylene polymer is present from about 0.1 wt % to about 60 wt %.

16. The electrical device of claim 9 wherein the propylene-ethylene polymer further comprises a diene selected from a group consisting of ENB and VNB.

17. The electrical device of claim 16 wherein the diene in the propylene-ethylene polymer comprises 0.5-4 wt % diene.

18. A wire or cable comprising a conductor, and at least one layer over the conductor wherein the at least one layer comprises a propylene-ethylene polymer, wherein the propylene-ethylene polymer comprises from about 5 to about 25 wt % ethylene, from about 75 to about 95 wt % propylene and optionally $\leq 10$ wt % diene, wherein the propylene-ethylene polymer has a MWD of from about 1 to about 5, a heat of fusion less than or equal to 75 J/g and a $T_m \leq 105°$ C.

19. The wire or cable of claim 18 comprising a first layer and/or a second layer, and wherein the propylene-ethylene polymer is present in the first layer and/or the second layer.

20. The wire or cable of claim 19 wherein the first layer and/or the second layer comprises from about 40 to about 100 wt % EPDM and from about 0.1 to about 60 wt % propylene-ethylene polymer.

21. The wire or cable of claim 18 wherein the propylene-ethylene polymer has a heat of fusion of from about 0.5 to about 70 J/g.

22. The wire or cable of claim 21 wherein the propylene-ethylene polymer has a heat of fusion of less than about 35 J/g.

23. The wire or cable of claim 18 wherein the propylene-ethylene polymer has a triad tacticity of three polymer units of about 75% or greater.

24. The wire or cable of claim 23 wherein the propylene-ethylene polymer has a triad tacticity of three polymer units of about 80% or greater.

25. The wire or cable of claim 18 wherein the propylene-ethylene polymer has a $T_m$ of about 30° C. to about 80° C.

26. The wire or cable of claim 19 wherein the first layer comprises the propylene-ethylene polymer.

27. The wire or cable of claim 19 wherein the second layer comprises the propylene-ethylene polymer.

28. The wire or cable of claim 19 wherein the first layer and the second layer comprise the propylene-ethylene polymer.

29. The wire or cable of claim 19 wherein the first layer and/or the second layer comprises from about 5 to about 20 wt % propylene-ethylene polymer.

30. The wire or cable of claim 26 wherein the first layer further comprises a second polymer.

31. The wire or cable of claim 27 wherein the second layer further comprises a second polymer.

32. The wire or cable of claim 30 wherein the second polymer is ethylene- and/or propylene-based.

33. The wire or cable of claim 32 wherein the second polymer is EPDM and is present from about 40 wt % to about 99.9 wt % and the propylene-ethylene polymer is present from about 0.1 wt % to about 60 wt %, based upon the weight of the layer.

34. The wire or cable of claim 31 wherein the second polymer is ethylene and/or propylene based.

35. The wire or cable of claim 34 wherein the second polymer is EPDM and is present from about 40 wt % to about 100 wt % and the propylene-ethylene polymer is present from about 0.1 wt % to about 60 wt %.

36. The wire or cable of claim 32 wherein the propylene-ethylene polymer further comprises a diene selected from a group consisting of ENB and VNB.

37. The wire or cable of claim 34 wherein the propylene-ethylene polymer further comprises a diene selected from a group consisting of ENB and VNB.

38. The wire or cable of claim 36 wherein the diene in the propylene-ethylene polymer comprises 0.5-4 wt % diene.

39. The wire or cable of claim 37 wherein the diene in the propylene-ethylene polymer comprises 0.5-4 wt % diene.

40. A process for making an electrical device comprising providing a conductor;
   extruding at least one layer over the conductor, wherein at least one of the layers comprises a propylene-ethylene polymer comprising from about 5 to about 25 wt % ethylene, from about 75 to about 95 wt % propylene and optionally $\leq 10$ wt % diene;
   wherein the propylene-ethylene polymer has a MWD of from about 1 to about 5, a heat of fusion less than or equal to 75 J/g and a $T_m \leq 105°$ C.

41. The process of claim 40 further comprising extruding at least a first layer and a second layer over the conductor.

42. The process of claim 41 wherein the second layer is over the first layer.

43. The process of claim 41 wherein the first layer comprises the propylene-ethylene polymer.

44. The process of claim 41 wherein the second layer comprises the propylene-ethylene polymer.

45. A wire or cable insulation shield layer comprising a propylene-ethylene polymer, wherein the propylene-ethylene polymer comprises from about 5 to about 25 wt % ethylene, from about 75 to about 95 wt % propylene and optionally $\leq 10$ wt % diene, wherein the propylene-ethylene polymer has a MWD of from about 1 to about 5, a heat of fusion less than or equal to 75 J/g; and a $T_m \leq 105°$ C.

46. A wire or cable insulation layer comprising a propylene-ethylene polymer, wherein the propylene-ethylene polymer comprises from about 5 to about 25 wt % ethylene, from about 75 to about 95 wt % propylene and optionally $\leq 10$ wt % diene, wherein the propylene-ethylene polymer has a MWD of from about 1 to about 5; and a $T_m \leq 105°$ C.

47. A cable coating compound comprising a propylene-ethylene polymer, wherein the propylene-ethylene polymer comprises from about 5 to about 25 wt % ethylene, from about 75 to about 95 wt % propylene and optionally $\leq 10$ wt % diene, wherein the propylene-ethylene polymer has a MWD of from about 1 to about 5; and a $T_m \leq 105°$ C.

48. A wire or cable comprising a conductor and an insulation layer over the conductor; wherein the insulation layer comprises from about 2 to about 20 wt % propylene-ethylene polymer, based on the weight of the layer, wherein the propylene-ethylene polymer has a MWD of from about 1 to about 5, a melting point of about 75° C. or less, and a heat of fusion of 50 J/g or less, comprises about 5-16 wt % ethylene, from about 75 to about 95 wt% propylene, and further comprises a second polymer wherein the second polymer is EPDM or isotactic polypropylene.

49. A wire or cable comprising a conductor and an insulation shield layer over the conductor; wherein the insulation shield layer comprises from about 2 to about 80 wt % propylene-ethylene polymer, based on the weight of the layer, wherein the propylene-ethylene polymer has a MDW of from about 1 to about 5, a melting point of about 75° C. or less, and a heat of fusion of 50 J/g or less, comprises about 5-16 wt % ethylene, from about 75 to about 95 wt % propylene, and further comprises a second polymer wherein the second polymer is EPDM or isotactic polypropylene.

* * * * *